United States Patent Office

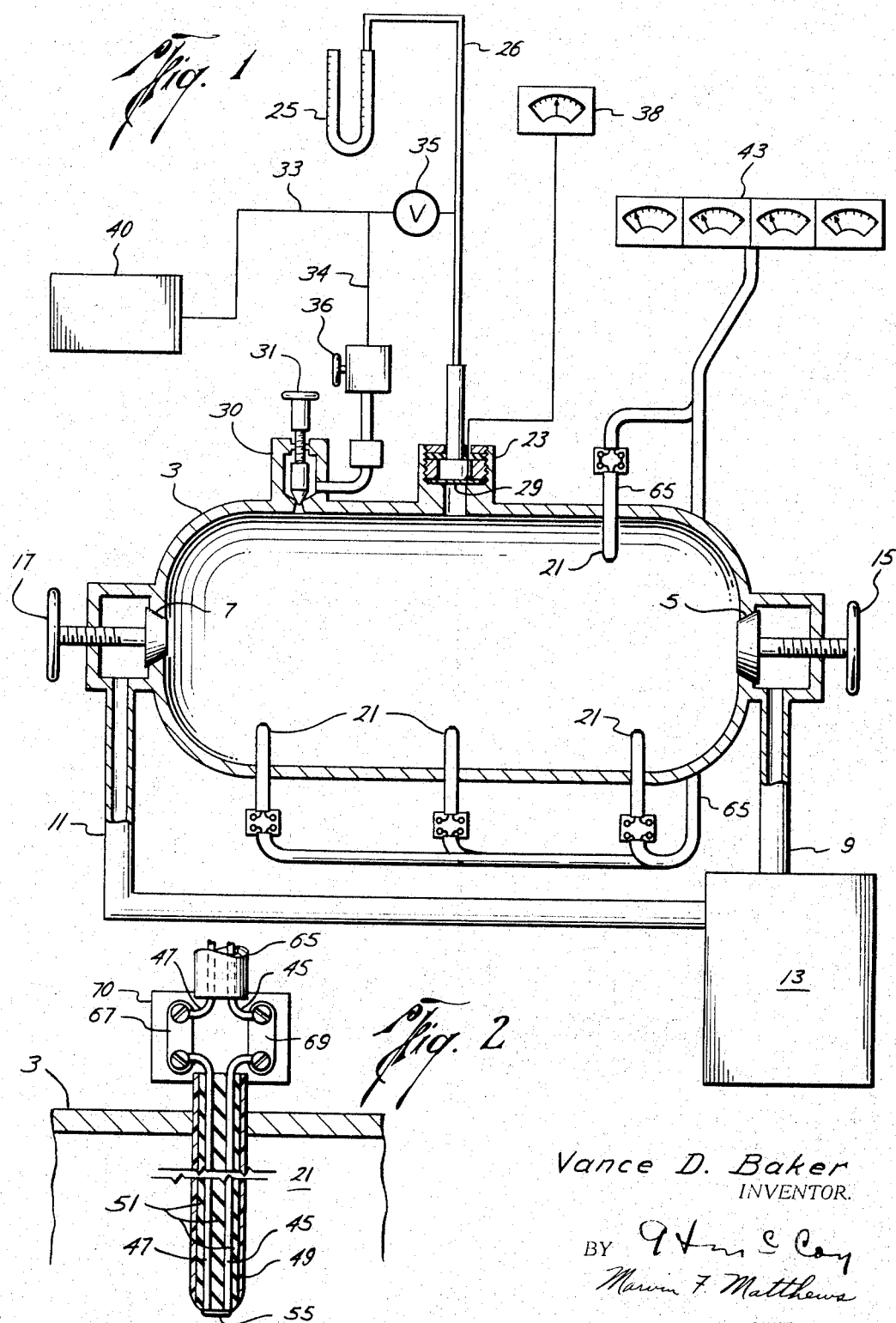

3,360,980
Patented Jan. 2, 1968

3,360,980
VAPOR PRESSURE MEASURING SYSTEM
AND METHOD
James E. Webb, Administrator of the National Aeronautics and Space Administration, with respect to an invention of Vance D. Baker, Manchester, Conn.
Filed Dec. 14, 1964, Ser. No. 418,362
9 Claims. (Cl. 73—29)

ABSTRACT OF THE DISCLOSURE

A method and apparatus for measuring the partial pressure of water vapor in a gas including a tank wherein a sample of mixed gases is confined, a water injector on the tank for introducing water into the gases to saturate the sample, a manometer attached to the tank for measuring pressure before and after the sample is saturated, and temperature probes in the tank for measuring any temperature changes therein. By using appropriate steam charts, the pressure increase and the temperature differential can be used to obtain the sample's water vapor pressure before the water was injected.

---

The invention described herein was made in the performance of work under a NASA contract and is subject to the provision of Section 305 of the National Aeronautics and Space Act of 1958, Public Law 85-568 (72 Stat. 435; U.S.C. 2457).

The invention described herein relates to a new and improved method and apparatus for measuring the partial pressure of water vapor in a gas.

In various types of equipment and processes which utilize or generate a gaseous medium it is desirable, if not necessary, to measure the partial pressure of water vapor in the gas. The present invention discloses an apparatus and procedure with which this measurement may be determined in a simple and expeditious manner. In carrying this invention into effect, it is necessary only to entrap a small sample of the gas in a vapor-tight vessel and, after noting the initial pressure of the gas sample, to inject droplets of water into the vessel. As this is done, the pressure will increase due to the increase in the partial pressure of evaporating water. When the pressure ceases to increase (the gas sample having reached its saturation point) a reading is taken of the amount of increase occurring from the initial reading. Through the use of this individual measurement, that is, the pressure increase, the vapor pressure of the gas sample is determined by locating on an appropriate steam table the value of saturated vapor pressure and subtracting therefrom the pressure increase obtained in the aforementioned steps.

Although the specifics of the invention are disclosed hereinafter, brief respect is paid to pertinent prior art in order to more clearly point out the advantages and novel features of the above procedure. Thus, in U.S. Patents 2,143,795 and 2,413,565 there is shown typical prior art means for measuring the partial pressure of water vapor in a gas. In each of these teachings an inordinate amount of equipment and time is required in order to obtain the desired partial pressure measurement. In the latter patent, for example, there is disclosed a condensation-vaporization technique wherein a quantity of gas is first entrapped in a vessel and in which all the moisture in the gas is subsequently condensed by lowering the temperature of the vessel to —186° F. While the low temperature is maintained, the gas remaining in the vessel is exhausted. The temperature of the vessel and contents is then raised to its original temperature, thus causing the condensed liquid in the vessel to vaporize and establish a vapor pressure therein. This pressure is measured in order to determine what the partial pressure of the water vapor in the gas was when it was intially introduced into the vessel. In order to put into practice this procedure there is required not only the gas vessel, temperature and pressure gauges, as required by the subject invention, but in addition thereto a refrigeration apparatus, exhaust mechanisms, and heat producing means. It is readily seen that the subject invention not only requires less equipment and time but is in addition more accurate over a wider range of temperatures and pressures than this technique.

The procedure described hereinafter is predicated upon Dalton's Law of partial pressures and upon its relationship to saturated and unsaturated gases. Dalton's Law merely states that the pressure of a sample of gas is equal to the sum of the partial pressure of each constituent gas and vapor therein. This may be expressed symbolically as:

$$P = p_1 + p_2 + p_{vp}$$

where
$p$ = pressure of the sample of gas
and
$p_1$, $p_2$ = the partial pressure of each of the constituent gases in the sample, and
$p_{vp}$ = the partial pressure of vapor in the gas sample The saturation point of a gas is reached when the number of water vapor molecules entering the liquid state is equal to the number of water molecules entering into the vapor state. The pressure exerted by the vapor under these conditions is referred to as the saturated vapor pressure and is, of course, dependent upon the prevailing temperature of the gas sample in accordance with the well-known molecular theory of gases. For this reason, it is important, when carrying out a precise measurement of water vapor pressure, that close attention be paid to the temperature of the gas during the measuring procedure. Thus at a given temperature, a certain sample of a gas has a degree of water vapor therein such that there can be no further increase in vapor pressure even if additional water molecules were introduced into the gas. The pressure of the gas under this condition is expressed by the relationship:

$$P = p_1 + p_2 + p_{sat\ v.p.}$$

where:
$p$ = pressure of the gas sample
$p_1$, $p_2$ = the partial pressure of each of the constituent gases in the sample
and
$p_{sat\ v.p.}$ = pressure of saturated water vapor in the gas at the temperature of the sample Although the value of $p_{sat\ v.p.}$ may be easily found by reference to a steam table, there is no such simple manner for determining the partial pressure of water vapor in a gas when it is not saturated. The following disclosure describes a relatively simple apparatus and associated method for determining the partial pressure of water vapor under such a condition. Reference therefore is made to the following detailed specification and drawings wherein:

FIG. 1 is a schematic illustration in partial cross section of the apparatus for determining the partial pressure of unsaturated water vapor in a gas in accordance with the subject invention.

FIG. 2 is an enlarged view of the temperature transducer means or thermo-couple sensors 21 of FIG. 1.

In FIG. 1 testing tank 3 has conduits 9 and 11 connected to inlet and outlet openings 5 and 7, respectively. The conduits are in turn connected to a gas system or gas container 13 from which a sample of gas is to be transferred. Provided at the inlet and outlet are valve handles 15 and 17 for closing the tank so as to entrap the gas therein. At various spaced points within the tank are a series of thermo-couple sensors 21, the purpose of which is to measure the average temperature of the gas sample before and after the vapor pressure measuring procedure. Also connected to tank 3 is a pressure transducer 23 having a central flexible diaphragm 29 which is electrically connected to an appropriately calibrated galvanometer 38 in a well-known manner so as to indicate movement of the diaphragm. For this purpose, the galvanometer has on its calibrated face a central null point which indicates equal pressure on both sides of the diaphragm when the needle points to it. An air pressure line 26, which communicates with a pressure calibrated U-tube 25, is connected in an airtight manner to the pressure transducer 23. An air feed line 33, running from an air supply tank 40, is connected to air pressure line 26. Disposed in feed line 33 is a regulating valve 35 for adjusting the pressure applied to the diaphragm.

Branching from feed line 33, forward of the regulating valve 35, is an air line 34 which transmits an air pressure sufficient to force droplets of water into the tank regardless of the pressure therein. There is also provided a pressure regulating valve 36 to adjust the pressure into injector 30 if necessary. Water is admitted through the injector 30 by operation of handle 31 on the injector.

As shown in FIG. 2, the thermo-couple 21 comprises a pair of wires 45, 47 extending longitudinally within an Inconel sheath 49 and insulated against each other by means of magnesium oxide insulation 51. The wires are constructed of two dissimilar metals such as Chromel-Alumel or other appropriate thermo-couple materials. The wires are welded or preferably silvered together to form a junction point or sensor 55 to thus complete a thermo-couple circuit. The sensor 55 extends externally to the tip of the Inconel sheath which is disposed within testing tank 3 so as to be in contact with the gas sample. Due to the different composition of the metals and to the heat which may be present within the container, a voltage is conducted through the wires to meters 43 which are calibrated so as to indicate the temperature within the container. The voltages generated by the above construction are in the range of .022 millivolt per degree and are directly proportional to the temperature. Although the magnesium oxide insulated wires may be run directly to the meters it is desirable in practice, for reasons of econmy, to use a glass insulation in the portion of the circuit extending from immediately outside the container to the meters. Since conventional splicing techniques may introduce foreign material into the thermo-couple circuit, a splicing connector 70 made of the same Chromel-Alumel material as the thermo-couple wires may be used. Sensing wires 45, 47 originating at the weld 55 are merely connected to their respective plates 67, 69 on the splicing connector 70. The circuit is then continued by connecting the glass insulated Chromel-Alumel wires of conductor 65 to the opposite sides of plates 67, 69. These glass insulated wires are then connected to the calibrated meters 43 in the same manner as if the magnesium oxide insulated conductors were run directly to said meters.

The preceding apparatus is utilized in the following manner to obtain partial pressure of water vapor in a gas sample. With reference to FIG. 1, valves 15 and 17 are opened, allowing the gas from system 13 to flow into and through the tank so as to purge it of moisture or previous gases therein. The outlet 7 is then closed and the tank is filled with a gas sample whereupon valve 15 is closed to thereby entrap the gas in the tank. After valve 15 is closed and while the needle on the pressure indicating galvanometer is monitored, pressure valve 35 is opened slightly to allow pressure into line 26. Since the needle on meter 38 was on the high side of the null point before the opening of valve 35 due to the pressure exerted upwardly on diaphragm 29 by the sample, it is seen that upon opening of this valve the needle will move back towards the null point because of the opposing pressure in the line 26 which now is exerted on the diaphragm. The opening of valve 35 is continued until the needle reaches the null point, thereby indicating that the opposing pressures on the diaphragm are equal. This pressure is read on U-tube 25.

After the pressure is noted, the gas sample temperature is taken. If the readings on the temperature meters of bank 43 differ, they may be averaged to obtain the initial temperature $T_1$. The temperature on the various meters in the bank will generally be the same however.

The water valve 31 is then actuated in order to inject a drop of water into the tank. Vaporization of this drop causes an increased pressure in the tank which is reflected in the U-tube reading. Subsequent drops of water are injected into the tank, thereby causing the U-tube level to rise in incremental amounts due to the continued vaporization of the water droplets after they enter the tank. This will occur until, at some point, the injection of a drop of water will have no effect upon the pressure in the U-tube, that is, it will not increase. At this point it is clear that the vapor in the tank is saturated, and it is ilkewise apparent that the increase from the initial U-tube reading to the final reading results solely from an increase in water vapor pressure. This increase is referred to as $\Delta P$. After this step is completed, the final temperature ($T_2$) is observed. Assuming for the moment, that $T_2$ is the same as $T_1$ reference is made to an appropriate steam table for the value of saturated steam at the temperature at which the above procedure takes place.

The value of the incremental increase in pressure is then subtracted from the value obtained in the steam table in order to obtain the partial pressure of water vapor in the gas originally introduced into the tank.

If the two temperatures are not the same, the partial pressure of water vapor in the gas originally introduced into the tank is determined in the same manner as above but it is modified by a temperature correcting factor which may be formulated as follows:

$$P_{vp} = P_{\text{sat v.p.}} - \left[ P_2 - P_1 \left( \frac{T_2}{T_1} \right) \right]$$

where $P_{vp}$ = water vapor pressure of the original gas sample at temperature $T_2$ and pressure $P_2$
$P_1$ = the absolute pressure of the gas sample before injecting water
$P_2$ = the absolute pressure of the gas sample after injecting water
$T_1$ = the average temperature in ° R. of the gas sample before injecting water
$T_2$ = the average temperature in ° R. of the gas sample after injecting water and $P_{\text{sat v.p.}}$ = the steam table value of saturated vapor pressure corresponding to temperature $T_2$ The temperature differential, i.e. ($T_2 - T_1$) results because of evaporation of the water droplets, which process has a tendency to cool the gas, thus lowering the pressure. Since the evaporating water droplets increase the overall gas pressure by reason of the increased vapor pressure, it is seen that an accurate indication of this increase may be prevented by the cooling affect of evaporation. In order to maximize the accuracy of the pressure differential reading ($\Delta P$), the temperature factor $T_2/T_1$ may be utilized in the manner described above.

It may be appreciated that the aforementioned apparatus and technique may be varied with some degree of latitude within the scope of the appended claims without departing from the essence of this invention. Having thus described the invention, the following claims describe that which is desired to be protected by Letters Patent:

1. The method of measuring the vapor pressure of a gas consisting of the steps of:

passing the gas through a container having an inlet and outlet;

closing the inlet and outlet simultaneously while the gas flows through said container, thereby entrapping a sample of the gas therein;

injecting incremental quantities of water into said sample until the vapor in said sample is saturated, and thereupon taking a temperature reading of said sample; and determining the increase in pressure of the sample which results from the injection of water and subtracting said increase from the steam table value of saturated vapor at said temperature reading to thereby obtain the partial pressure of water vapor in the initial gas sample.

2. The method of measuring the vapor pressure of a gas consisting of the steps of:

passing the gas through a container having an inlet and outlet therein;

simultaneously closing the inlet and outlet while the gas is flowing through the container to thereby entrap a sample within;

reading the temperature and pressure of the gas sample immediately prior to the injection of a small amount of water into the container;

injecting an increment of water into the container, the subsequent evaporation of which causes the pressure of the gas sample to rise;

injecting further water into the container until, upon the introduction of a final amount of water, no pressure increase occurs;

reading the temperature and magnitude of pressure increase subsequent to said final injection; and determining the partial pressure of water vapor in the initial gas sample by subtracting said pressure increase from the steam table value of saturated vapor at the final temperature of said gas sample.

3. The method of measuring the vapor pressure of a gas consisting of the steps of:

passing the gas through a container having a gas inlet and outlet;

simultaneously closing the inlet and outlet while the gas is flowing through the container to thereby entrap a sample of the gas therein;

reading the temperature and pressure of the gas sample immediately prior to the injection of a small amount of water into the container;

injecting an increment of water into the container the subsequent evaporation of which causes the pressure of the gas sample to rise;

injecting further water into the container until, upon the introduction of a final amount of water, no pressure increase occurs; and determining the increase in pressure as a result of the series of water injections so that the partial pressure of water vapor in the initial gas sample is obtained by subtracting said increase from the steam table value of saturated vapor at the temperature of the gas sample.

4. An apparatus for determining the partial pressure of water vapor in a gas comprising:

a container for enclosing the gas therein including an inlet, an outlet, and means for closing said inlet and outlet so as to entrap a gas sample therein;

means for saturating the enclosed gas with water including a water injection device having air pressure means integrally connected thereto for injecting water into a gas sample under elevated pressure; and means for sensing and measuring both the initial pressure of the enclosed gas and also the pressure when the gas becomes saturated with water so that the difference between said pressures may be used to obtain the partial pressure of water vapor in said gas.

5. The apparatus for determining the partial pressure of water vapor in a gas as described in claim 4 wherein:

the means for sensing the gas pressure consists of a tranducer device having a pressure sensitive diaphragm therein;

said diaphragm having one side thereof exposed to the gas in said container and the other side in communicative relation to said pressure measuring means.

6. The apparatus for determining the partial pressure of water vapor in a gas as described in claim 5 wherein:

said pressure measuring means includes an air line with regulating means therein;

one end of said air line open to an area enclosed by said sensing means;

the other end of said air line operatively connected to one leg of a calibrated pressure tube; and means for indicating that the gas pressure on one side of the diaphragm is equal to the air pressure on the other side.

7. The apparatus for determining the partial pressure of water vapor in a gas as described in claim 4 which includes:

thermo-couple means for sensing and measuring the temperature of the gas before and after the injection of water into the container.

8. The apparatus for determining the partial pressure of water vapor in a gas as described in claim 7 wherein said thermo-couple means comprises:

an elongated Inconel sheath having a pair of dissimilar metallic wires insulated against each other extending therethrough;

a portion of said elongated sheath disposed within said container;

means fusing said wires together at the terminus of said elongated sheath within the container;

a portion of said fusing means being external to said sheath; and temperature calibrated meter means for measuring gas temperature;

the ends of said wires opposite of said fused end being connected to said meter.

9. The apparatus for determining the partial pressure of water vapor in a gas as described in claim 6 which includes:

thermo-couple means for sensing and measuring the temperature of the gas before and after the injection of water into the container.

References Cited
UNITED STATES PATENTS

| | | | |
|---|---|---|---|
| 2,143,795 | 1/1939 | Okey | 73—29 |
| 2,143,775 | 1/1939 | Hertel | 73—29 |
| 2,413,565 | 12/1946 | Hewlett | 73—29 |
| 3,037,375 | 6/1962 | Jacobs et al. | 73—29 |
| 3,191,428 | 6/1965 | Piros | 73—29 |

RICHARD C. QUEISSER, *Primary Examiner.*

JAMES J. GILL, *Examiner.*

C. I. CLELLAND, *Assistant Examiner.*